United States Patent [19]

Willermet et al.

[11] 4,196,182
[45] Apr. 1, 1980

[54] MOLDING ARTICLES WHICH CAN BE CONVERTED TO POROUS CARBON BODIES

[75] Inventors: Pierre A. Willermet, Livonia; Robert A. Pett, Franklin, both of Mich.

[73] Assignee: Ford Motor Company, Dearborn, Mich.

[21] Appl. No.: 967,552

[22] Filed: Dec. 7, 1978

[51] Int. Cl.² ............................................. C01B 31/02
[52] U.S. Cl. ................................. 423/449; 264/29.1; 423/445
[58] Field of Search ....................... 423/445, 448, 449; 264/29.1

[56] References Cited

U.S. PATENT DOCUMENTS

| 3,969,124 | 7/1976 | Stewart | 423/445 X |
| 4,124,529 | 11/1978 | Juntgen et al. | 423/445 X |

OTHER PUBLICATIONS

Hendricks et al. "Rubber Technology", 2nd Ed., pp. 515-533, Van Nostrand Co., 1973.
Haws et al., "Rubber World", Jan. 1973, pp. 27-30 & 32.

Primary Examiner—Edward J. Meros
Attorney, Agent, or Firm—Edmund C. Ross, Jr.; Olin B. Johnson

[57] ABSTRACT

Improvements in molded articles which can be converted to porous carbon bodies, improvements in method for making such articles, and sacrificial binders for use in making such articles are disclosed. The sacrificial binders used in this invention comprise block polymers having the structural formulae

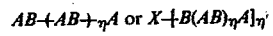

wherein "$\eta$" is 0 or a positive integer, "A" is a linear or branched polymer that is glassy or crystalline at room temperature and has its softening point in the range of about 80° C. to about 250° C., "B" is a polymer different from "A" that behaves as an elastomer at processing temperatures, "$\eta'$" is a positive integer greater than 2, and "X" is a linking group, a plasticizer which may be oil, wax, or oil and wax, and optionally other components.

5 Claims, No Drawings

MOLDING ARTICLES WHICH CAN BE CONVERTED TO POROUS CARBON BODIES

BACKGROUND OF THE INVENTION

This invention relates to porous carbon bodies made with sacrificial binders and particulate carbonaceous or carbon yielding materials. The sacrificial binder contains block polymers that are not only beneficial to maintain the shape of the article in the green body state but, also, upon "burn out" and carbonizing, their residue serves to maintain the shape of the resultant porous carbon body.

U.S. Ser. Nos. 810,464 and 810,458 filed June 27, 1977 by Pett et al, respectively, now U.S. Pat. No. 4,158,688 and 4,158,689, relate to using similar block polymers with sinterable materials to provide sintered bodies.

Carbon bodies have been made heretofore, see for example, U.S. Pat. Nos. 3,859,421; 2,431,326; 3,269,802; 3,718,720; 3,917,884; and 3,932,568. This invention, however, relates to porous carbon bodies that are in complex shape after molding as under heat and pressure and in which the sacrificial binder, acting to maintain such shape in green body stage, further after "burn-out" aids in its carbon residue form to maintain integrity of the carbon body. Expulsion during "burn-out" of the binder provides carbon bodies of sufficient porosity for infiltration.

THE INVENTION

This invention relates to improved molded articles which can be converted to porous carbon bodies, and to methods and materials for producing articles from carbonaceous and carbon yielding materials which exhibit unusual physical integrity in the green body stage and unusual dimensional precision as final products, i.e., after "burn-out" and carbonization. In particular, this invention is concerned with articles produced by mixing carbonaceous or carbon yielding solids with a thermoplastic, sacrificial-binder material, molding the article into its green body configuration, "burning out" the sacrificial-binder material and carbonizing the residue into a porous carbon body, with methods for making such articles and to sacrificial binders for use in making such articles. This invention is applicable to all particulate solids which are carbonaceous or carbon yielding, as those terms are hereinafter defined.

The sacrificial binders of this invention are thermoplastic and contain, in one embodiment, as the principal binder resin a thermoplastic, rubber-related, block polymer having the physical properties hereinafter delineated, and the structural formula AB $(AB)_\eta$ A, wherein "$\eta$" is 0 or a positive integer, "A" is a linear or branched polymer that is glassy or crystalline at room temperature and has its softening point in the range of about 80° C. to about 250° C. and "B" is a polymer different in chemical composition from A that behaves as an elastomer at processing temperatures. A detailed description of block polymers, their preparation, composition and physical properties are to be found in "Synthesis of Block Polymers by Homogeneous Anionic Polymerization" by L. J. Fetters, Institute of Polymer Science, The University of Akron, Akron, Ohio published in the Journal of Polymer Science, Part C, No. 26, pages 1-35 (1969) and "Rubber-Related Polymers, I. Thermoplastic Elastomers" by W. R. Hendricks and R. J. Enders, Elstomers Technical Center, Shell Development Company, Torrance, Calif., published in Rubber Technology, Second Edition, Chapter 20, pages 515-533, by Van Nostrand Reinhold Company, New York, Cincinnati, Toronto, London and Melbourne (1973), which are incorporated herein by reference. For the details of vacuum apparatus and method for performing anionic initiated polymerizations which can be used to produce block polymers, see "Procedures for Homogeneous Anionic Polymerization" by Lewis J. Fetters, Journal of Research of the National Bureau of Standards, Vol. 70A, No. 5, September-October 1966, pages 421-433 and "The Association of Polystyryllithium, Polyisoprenyllithium, and Polybutadienyllithium in Hydrocarbon Solvents," by Maurice Morton, Lewis J. Fetters, R. A. Pett, and J. F. Meier, Institute of Polymer Science, published in Macromolecules, Vol. 3, pages 327-332, by the American Chemical Society (1970) which are herein incorporated by reference.

The sacrificial binders of this invention in another embodiment are also thermoplastic and contain as the principal binder resin a thermoplastic, rubber-related, block polymer having the physical properties hereinafter delineated, and the structural formula X [B(AB)$_\eta$ A]$_{\eta'}$, wherein "X" is a linking group A or B, "$\eta$" is 0 or a positive integer, "$\eta'$" is a positive integer greater than 2, "A" is a linear or branched polymer that is glassy or crystalline at room temperature and has its softening point in the range of about 80° C. to about 250° C. and "B" is a polymer different in chemical composition from A that behaves as an elastomer at processing temperatures. A detailed description of block polymers, their preparation, composition and physical properties are to be found in, besides articles as above disclosed, "Synthesis of Trichain and Tetrachain Radial Polybutadiene," by R. P. Zelinski and C. F. Wofford and published by Journal of Polymer Science: Part A, Vol. 3, pages 93-103 (1965), "Rheological Properties of Multichain Polybutadienes," by G. Kraus and J. T. Gruver and published by Journal of Polymer Science: Part A, Vol. 3, pages 105-122 (1965), and "Steady Flow and Dynamic Viscosity of Branched Butadiene - Styrene Block Copolymers" by G. Kraus, F. E. Naylor and K. W. Tollmann and published by Journal of Polymer Science: Part A-2, Vol. 9, pages 1839-1850 (1971) which are incorporated herein by reference.

In still another embodiment, combinations of the above polymers may be employed.

Basically, the concept here involved provides for making porous carbon articles from particulate solids employing sacrificial binders which behave as thermoplastics during the processing, i.e., mixing and molding, in that they flow readily at the temperatures used for these operations and yet behave in the nature of thermosets during storage of the green body at room temperature and at elevated temperature until the body has taken permanent form. This is achieved with the block polymer elastomers hereinbefore and hereinafter more fully described and the oil or wax or oil and wax used as plasticizer. The oil or wax serves to aid in processing by reducing the viscosity of the elastomer which is of particular importance during the application of shear forces at mixing and molding temperatures. Thus, when the temperature of the material is raised above the glass transition temperature of the block polymer elastomer, i.e., the glass transition temperature of the "A" segments of the block polymer, and shear forces are applied, the material becomes less viscous and flows like a thermoplastic. When the system is cooled to room temperature after forming, the "A" segments, e.g., polystyrene, tend to agglomerate to form "domains" and provide a structure similar in physical behavior to a crosslinked polymer. Subsequent heating at a higher temperature drives off the oil and/or wax. As no applied shear forces other than gravity are present during heating, the "A" segment domains remain in their agglomerated form, thus maintaining the shape of the green body during heating and such shape is maintained thereafter by residual carbon of the binder.

DETAILED DESCRIPTION OF THE INVENTION

A. The Principal Binder Resin

The principal binder resin is preferably a thermoplastic block polymer having the structural formula AB $(AB)_\eta$ A wherein "$\eta$" is 0 or a positive integer and "A" and "B" are different polymers. This block polymer advantageously comprises in excess of 50 wt. % of polymeric material in the binder excluding the oil and/or wax of the plasticizer. For purposes of simplicity, these polymers will be primarily discussed with reference to their most simple form wherein "$\eta$" is 0, i.e., a block polymer of the structural formula A-B-A. It is to be understood that the statements made about these triblock polymers apply equally to those block polymers wherein "$\eta$" is one (1) or greater even though certain of the "A" segments will not be terminal and certain of the "B" segments will not be center segments.

The "A" segments of these block polymers are non-crosslinked, linear or branched polymers which are glassy or crystalline at room temperature and have their softening point in the range of about 80° C. to about 250° C. When the molded article is in the green body stage, i.e., after formation and prior to burn-out of the sacrificial binder, and at room temperature, i.e., 20°–25° C., the "A" segments exhibit a modulus greater than $10^9$ dynes/cm$^2$. Where the block polymers are prepared by anionic polymerization, suitable materials for the "A" segments include, but not by way of limitation as one skilled in the art will recognize from the physical and chemical characteristics of these and similar polymers, polystyrene, poly(p-bromostyrene), poly (methyl methacrylate), poly(alphamethylstyrene), poly(2-methyl-5-vinylpyridine) and poly(4-vinylpyridine). Other block polymers suitable for use in this invention are advantageously prepared by other synthesis routes, i.e., polycondensation, free radical initiated polymerization and cationic polymerization using techniques known to the art. When these other syntheses are employed, suitable materials for the "A" segments include, but not by way of limitation as one skilled in the art will recognize from the physical and chemical characteristics of these and similar polymers, poly(vinyl acetate), polyesters, polyamides, polyurethanes, poly(vinyl chloride), polypropylene, polysulfones, poly (phenylene sulfide), poly (4-methyl pentene-1) and poly (vinyl alcohol).

The "B" segment of these A-B-A polymers are either rubbery, flexible, glassy or crystalline polymers, as those terms are hereinafter defined, and behave as elastomers at processing temperatures. The "B" segment may be linear or branched and in some embodiments is chemically crosslinkable. In such embodiments, a crosslinking agent therefor is added during mixing and reacted on molding. When the molded article is in the green body stage and at room temperature, it exhibits a modulus of about $10^6 - 5 \times 10^7$ dynes/cm$^2$ when the "B" segment is a rubbery polymer. Where the "B" segment is a flexible polymer, at room temperature, this modulus will be in the range of about $10^7 - 10^9$ dynes/cm$^2$. Where the "B" segment is a glassy or crystalline polymer at room temperature, this modulus will be above about $10^9$ dynes/cm$^2$. Where the block polymers are prepared by anionic polymerization, suitable materials for the "B" segments include, but not by way of limitation as one skilled in the art will recognize from the physical and chemical characteristics of these and similar polymers, polybutadiene, polyisoprene, polydimethylbutadiene, poly(ethylene oxide), poly(isopropyl acrylate), poly(octamethylcyclotetrasiloxane), and poly(tetrahydrofuran). As aforementioned, block polymers suitable for use in this invention are advantageously prepared by other synthesis routes, i.e., polycondensation, free radical initiated polymerization and cationic polymerization. When these other syntheses are employed, suitable materials for the "B" segments include, but not by way of limitation as one skilled in the art will recognize from the physical and chemical characteristics of these and similar polymers, polyisobutylene, ethylene propylene rubber, ethylene propylene diene terpolymers, butyl rubber, chlorobutyl rubber, bromobutyl rubber, chlorosulfonated polyethylene, epichlorohydrin rubber, fluorocarbon rubbers, silicone elastomers, e.g., polydimethylsiloxane, polyurethane elastomers and polypropylene oxide elastomers.

The molecular weights of the "A" segments and the "B" segments of the block polymers suitable for use with this invention will vary with the polymer segment involved as will be obvious to one skilled in the art in that physical characteristics must be met as hereinbefore recited. For instance, where the block polymer has polystyrene "A" blocks and polybutadiene "B" blocks, the polystyrene segments advantageously have molecular weights below about 20,000 and at least two of such segments have molecular weights above about 10,000 whereas the polybutadiene segment or segments advantageously have molecular weight or weights below about 80,000 and at least one such segment has molecular weight above about 40,000. The lower limit of molecular weight for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation or processing.

To mix the block polymer with either of the other components of the sacrificial binder or with the particulate solids, the block polymer must be heated to the softening point of the "A" segments or above. Once the block polymer has been mixed with the other components of the sacrificial binder, the oil and/or wax can serve as a plasticizer and permit subsequent working, e.g., molding, etc., at a temperature below the softening point of the "A" segments. The lower temperature limitations for such working will depend upon the chemical composition of the "A" segments, the degree to which they are plasticized and the plasticization qualities of the plasticizer. In all cases, however, the lower limit of the working temperatures for such binders will be above the temperature at which the "B" segments of the block polymers cease to behave as elastomers. In general, the mixing temperature is advantageously in the range between about 15° C. below the softening point of the "A" segments of block polymer used and about 70° C. above such softening point, except where mixing is carried out in the absence of gaseous oxygen in which case the temperature may be increased to about 100° C. above such softening point. Thus, the forming temperatures which may be used with the various suitable block polymers will vary between about 65° C. and about 320° C. or 350° C. in the absence of air or other gaseous oxygen. Forming, other than embossing, is carried out at temperatures above the softening point of the "A" segments. Embossing can be carried out at the same temperatures or even below the softening point of the "A" segments.

In the thermoplastic block polymers having the A-B-A structure, the end segments, "A", which are rigid at room temperature associate with each other to give large aggregates which are referred to in the literature as "domains". At normal handling temperature for the molded article after final forming of the green body stage, e.g., room temperature or slightly above, these domains are hard and immobilize the ends of the "B" segments. This end segment immobilization in conjunction with chain entanglements creates physical crosslinks which helps to protect the green body from disfiguration as the result of handling. At higher temperatures, the terminal, "A" segments soften and may be disrupted by applied stress, allowing the polymer to flow. The latter condition makes possible the mixing, molding, etc. which are necessary or optional steps in preparing the green body. Cooling will then provide a green body having unusual resistance to physical change prior to the heating associated with burn-out and carbonizing.

B. The Plasticizer

The sacrificial binder also includes a plasticizer which is either an oil or a wax or both. The oils and waxes used for this purpose are at least about 50% and desirably at least about 70% by weight napthenic, paraffinic or a mixture of paraffinic and naphthenic constituents. They are sufficiently volatile to be removed easily and rapidly in the burnout process but insufficiently volatile to be substantially removed during mixing and/or molding. The loss due to volatilization during mixing and/or molding is advantageously below 20 and preferably below 10 weight percent.

Functionally, the oils and/or waxes must be compatible with the rubbery phase of the principal binder resin when it becomes rubbery on plasticization at a temperature somewhat below the softening point of the "A" segments of the principal resin. This gives the binder a capability of accepting high particulate loadings while remaining strong and flexible.

At least 75% by weight of the oils used as plasticizers boil in the range of about 550° F. to about 1038° F., preferably in the range of about 550° F. to about 865° F. They have viscosities at 210° F. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have their Aniline Point in the range of about 170° F. to about 255° F. The oils may be a product of petroleum refining operations or vegetable or animal oils and they may include or be low molecular weight synthetic polymers such as polystyrene, poly(alpha-methyl styrene), or a polyolefin.

The waxes used have melting points in the range of about 130° F. to about 170° F. At least about 75% by weight of such wax boils at temperatures in the range of about 600° F. to about 900° F. These may be a product of petroleum refining operations, vegetable or animal waxes or synthetic polymers such as low molecular weight polyolefins.

C. Optional Constituents

The sacrificial binders of this invention may and in certain embodiments advantageously do contain additional materials such as supplementary resins, supplementary elastomers and antioxidants.

Supplementary resins are useful in embodiments where there is a desire to increase the stiffness of the green body while still providing fluidity at processing temperatures. Suitable secondary resins include any of the aforementioned polymers suitable for use as "A" segments in block polymers, resins similar to resins suitable for use as "A" segments and having affinity for the "A" segments of the block polymer used, e.g., cumarone-indene resins and polyindene with block polymers having polystyrene "A" blocks, and resins which have an affinity for the "B" segment or segments in the block polymers, e.g., polyterpenes with polybutadiene "B" blocks. It is to be understood that resins having an affinity for the "A" or "B" segments of the block polymer may also be polymers suitable for use as "A" or "B" respectively in other embodiments when they meet the limitations set forth herein for "A" or "B".

Supplementary elastomers are useful in embodiments where there is a desire to improve tear strength in the green body. Suitable secondary elastomers include natural rubber and synthetic elastomers, e.g., polybutadiene, polyisoprene, etc.

Antioxidants are useful to retard oxidative degradation of the block polymer during mixing thus minimizing loss of strength in the green body. The antioxidant also allows more rapid removal of binder during burn-off by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetrakis[methylene-3-(3',5'-ditert-butyl-4'-hydroxyphenyl) propionate] methane, etc.

Process aids which are conventional to molding and forming operations with polymeric materials are likewise useful in the practice of this invention to improve the release characteristics of the green body from any type of molding or forming apparatus with which the green body comes in contact and to improve the flow characteristics of the binder-filler mixture during such operations as extrusion molding, injection molding, transfer molding, etc. Process aids which may be of assistance include methylacetylricinoleate, stearic acid, polyethylene, polyethylene wax, mixtures of natural waxes and wax derivatives, vegetable fats, partially oxidized polyethylene, etc.

D. Particulate Material

This invention is applicable to all particulate material that is carbonaceous, substantially carbonaceous or which can be treated to yield a carbonaceous residue. Specific examples include materials which are or can be made into particulates such as graphite, carbon black, glassy carbon, cellulosic materials, pitches, tars, polyacrylonitrile resins, and polymers with a high proportion of aromatic content. Specific examples of such polymers include phenol formaldehyde and phenol furfural resins, polyphenylene oxide, polyphenylene sulfide, aromatic polyesters, polysulfone and urea formaldehyde resins.

One of the advantages of the binders is that they can accommodate a high volume fraction of particulate solids.

The molding mixture advantageously comprises from about 30 to about 70, preferably about 50 to about 65, volume percent particulate solids with the balance being made up of the sacrificial binders.

E. Proportions of Binder Constituents

The proportions of the principal binder resin or elastomer, i.e., the block polymer, and the plasticizer, i.e., the oil, wax or oil and wax, may vary widely. In a binder consisting solely of the block polymer and plasticizer, the block polymer will comprise between 10 and 90, preferably between about 30 and about 85, and most preferably between about 45 and about 65, weight percent of the total binder with the plasticizer comprising the balance, i.e., between 90 and 10, preferably between about 70 and about 15, and most preferably between about 55 and about 35 weight percent, provided, however, that the wax constituent when used, advantageously does not exceed about 70 weight percent of the binder.

It will be understood that one may replace any fraction less than 50 weight percent, i.e., 0 to between 49 and 50, more commonly between about 0.1 and about 30, weight percent of the block polymer aforedefined with an equivalent amount by weight of another polymer that is within the limitations of "A" in the aforementioned formula.

It will also be understood that one may replace any fraction less than 50 weight percent, i.e., 0 to between 49 and 50, more commonly between about 0.1 and about 30, weight percent of the aforedefined block polymer with an equivalent amount by weight of another polymer that is within the limitations of "B" in the aforementioned formula.

It will be further understood that one may replace all or any fraction of the block polymer aforedefined with an equivalent amount by weight of a block elastomer polymer having the structural formula X [B (AB)$_\eta$A]$_{\eta'}$ wherein "X" is a linking group e.g., derived from multifunctional halogen functional linking agent, "A" or "B" "$\eta$" is 0 or a positive integer, "$\eta'$" is a positive integer greater than 2 and "A" and "B" have the same limitations as "A" and "B" in the hereinbefore described block polymer having the structural formula AB $(AB)_\eta$ A, except that "B" of said elastomer polymer desirably also behaves as an elastomer at temperatures between about 5° C. up to about 15° C. below the softening point of "A" of said block polymer aforedefined. The linking agent, when the block polymer has a linking agent, is a multifunctional (>2) compound consisting essentially of elements selected from the group consisting of carbon, hydrogen, oxygen, halogens, nitrogen, silicon, phosphorous and sulfur. When anionic polymerization is used this is a halogen functional coupling species. The following are illustrative but not exhaustive: silicon tetrachloride, 1,2,4-tri (chloromethyl)benzene, 1,2,4,5-tetra(chloromethyl) benzene, Bis (trichlorosilyl)ethane, cyclic trimer of phosphonitrilic chloride, benzene, chloromethylated polystyrene, trichloromethylsilane, and silicon tetrachloride. The use of these linking agents is discussed in the aforementioned article "Synthesis of Block Polymers by Homogeneous Anionic Polymerization" by L. J. Fetters.

When the block polymers are prepared by other synthesis routes as aforementioned, one would use other linking agents. In the case of free radical polymerization, one may use a multifunctional compound that will initiate polymerization of the "B" block, as when the "B" block, e.g., a branched azonitrile such as one prepared by reacting trimethylolpropane with a diisocyanate such as toluene diisocyanate and a glycol such as poly(oxypropylene glycol). In the case of polycondensation, one may use a multifunctional compound that will react with the "B" block, as when the "B" block is polyisobutylene, and react with the "B" block. As aforementioned, "X" may be polymer "A", polymer "B" or other linking group. For purposes of this invention and the use of such block polymers in sacrificial binders for a molding mixture, the substitution of a linking agent for polymer "A" or polymer "B" as the "X" component does not materially affect the physical properties of the block polymer. Linking agents are conventionally used in such block polymers and are well known to those skilled in the art as shown in the hereinbefore cited literature. With such teachings, selection of a specific linking agent for a specific block polymer is quite within the skill of those skilled in the art.

In combination the substitutions of such "A" type polymers, such "B" type polymers and such other type of block polymers should constitute less than 50 weight percent of the principal binder resin, block polymer or block elastomer previously described.

In the following table there is set forth advantageous ranges for constituents when optional materials are included.

| Material | Sacrificial Binders With Optional Constituents | | |
|---|---|---|---|
| | Range, Wt.% of Binders | Preferred Range Wt.% of Binder | Most Preferred Range Wt.% of Binder |
| block polymer | 10–90 | 30–85 | 45–65 |
| plasticizer | 90–10 | 70–15 | 35–55 |
| oil | 0–90 | 0–70 | 0–55 |
| wax | 0–70 | 0–30 | 0–10 |
| secondary resin | 0–40 | 0–25 | 0–15 |
| secondary elastomer | 0–40 | 0–15 | 0–10 |
| antioxidants | 0–7 | 0–5 | 0–3 |
| process aids | 0–15 | 0–10 | 0–7 |

F. Definitions

The term "carbonaceous" is used herein to mean a material that is all or substantially all carbon.

The term "molding" is used therein to means any of the methods of forming known in the art as extrusion molding, injection molding, compression molding, laminating which includes compression molding, transfer molding, pressure molding, displacement molding, blow molding, calendering, and embossing.

The term "processing" is used herein to mean mixing, forming, and mixing and forming.

The term "green body" is used herein to mean a molded article comprising an intimate mixture of carbonaceous or carbon yielding solids and a thermoplastic, organic binder.

The term "molecular weight" is used herein to mean average molecular weight ($\bar{M}_n$).

The term "room temperature" is used herein to mean a temperature in the range of 20°–25° C.

The term "softening point" is used herein to mean the glass transition temperature when used with respect to glassy polymers and the crystalline melting point when used with respect to crystalline polymers.

The term "glass transition temperature" is signified herein by the symbol "$T_g$" and is used herein to mean that temperature below which a non-crystallizing polymer becomes a supercooled liquid, i.e., a glass.

The term "crystalline melting point" is signified herein by the symbol "$T_m$" and is used herein to mean that temperature at which a crystalling polymer melts and becomes non-crystalline.

Both "glass transition temperature" and "crystalline melting point" represent areas of transition but are practical terms which are sufficiently definitive and exact for the full and complete practice of this invention by one skilled in the art without experimentation beyond normal routine.

The term "glassy polymer" is used herein to mean a non-crystallizing polymer which at room temperature is below its glass transition temperature.

The term "rubbery polymer" is used herein to mean a non-crystalline polymer that is above its $T_g$ at room temperature.

The term "crystalline polymer" is used herein to mean a crystallizing polymer which is below its $T_m$ at room temperature.

The term "flexible polymer" is used herein to mean a polymer which at room temperature is in transition from glass or crystalline material to an elastomeric state, i.e., to a rubber.

The term "carbonizing" is used herein to mean reducing a material to elemental or substantially elemental carbon.

It will be understood by those skilled in the art that it is possible for portions of a particular polymeric mass to exist in more than one state at room temperature and not be in a state of transition from one to the other, e.g., a polymeric mass in which one portion is a "rubbery polymer" as defined above and a second portion is a "crystalline polymer" as defined above. Thus, the defined term concerned shall be understood to mean that the largest fraction of such polymeric mass meets the limitations of the term used.

The following are illustrative examples wherein, unless otherwise specified, the materials used are within the limitations hereinbefore set forth for such materials in the practice of this invention.

EXAMPLE 1

An A-B-A block polymer elastomer, hereinafter called "the elastomer", is prepared by an anionic initiated polymerization using the basic high vacuum apparatus and general procedures for anionic polymerization described in section 2 (Experimental Techniques) of the aforecited article "Procedures for Homogeneous Anionic Polymerization", by L. J. Fetters. In addition, all attachments of the vessels to the vacuum line are accomplished through a grease trap as shown in the aforecited article "The Association of Polystyryllithium, Polyisoprenyllithium, and Polybutadienyllithium in Hydrocarbon Solvents" by M. Morton et al.

The reactor is first flamed while under vacuum. The reactor is cooled, sealed off from the vacuum line, and then rinsed with a solution of ethyllithium in n-hexane to react with any residual materials that could terminate the growing polymer chains. The monomers and solvents to be used in preparing the elastomer are purified according to the article by L. J. Fetters last mentioned above.

The reactor is reattached to the vacuum line. A solution containing 0.036 grams of ethyllithium in 3 ml. benzene is added to the reactor. To the reactor is charged 370 ml. of benzene. Styrene monomer in the amount of 15 grams is distilled into the reactor through a breakseal onto the top of the benzene. The contents are cooled to dry-ice/alcohol temperatures e.g., −65° C. to −78° C. The reactor is sealed off from the vacuum line and the contents allowed to warm-up from a dry-/ice alcohol temperature. As soon as the contents have thawed 0.65 grams of anisole in 4 ml. of benzene is added and shaken with the benzene and styrene in the reactor. The polymerization of the styrene is allowed to proceed for 4 hours at 30° C. The reactor is then reattached to the vacuum line and 60 grams of butadiene is distilled in. After the contents have been cooled with liquid nitrogen, the reactor is sealed off from the vacuum line. The mixture is allowed to thaw and, after stirring, the polymerization of butadiene is allowed to proceed at 30° C. for 16 hours. The mixture is cooled to a dry-ice/alcohol temperature and 15 grams of styrene are distilled in after the reactor has been attached to the vacuum line. The reactor is once again sealed off from the vacuum line, the contents thawed and mixed, and polymerization of the styrene allowed to continue for 4 hours at 30° C. The elastomer in the reactor is then coagulated by slowly pouring the benzene solution into methanol containing a small amount of phenylbetanaphthylamine to stabilize the elastomer. The elastomer is dried and is then ready for use as the principal binder resin.

This polystyrene-polybutadiene-polystyrene elastomer containing about 33.3 weight % polystyrene in the amount of 5.0 grams is banded on a tight mill which has been preheated to 150° C. Microcrystalline cellulose (TLC reagent, obtained from J. T. Baker) in the amount of 13.3 grams and paraffin wax with a melting point of about 55° C. in the amount of 5.0 grams are added alternately (to the band) in small amounts with mixing. When mixing is complete in about one hour, the composition is stripped from the mill and allowed to cool.

Parts of the desired shape, for example gas turbine blades, are produced by injection molding. The composition is cut into pellets and placed in the barrel of a ram type injection molding machine preheated to 135° C. After allowing a few minutes for the material to come to temperature, the material is injected into a turbine blade mold at ambient temperature. The part is then removed from the mold and is ready for further processing.

The part is then placed in a container, covered with loose sand, and heated to 1100° C. under nitrogen at a heating rate of 19° C. per hour. The resulting porous carbonaceous body has retained its shape but has undergone considerable shrinkage.

The porous carbonaceous body is then placed in a vacuum furnace and reacted with silicon to form a silicon carbide/silicon composite as described in U.S. Pat. No. 3,947,550, "Method of Making a Silicon Carbide Article of Less than Full Density", issued to Douglas R. Fitchman on Mar. 30, 1976. The resulting product is a strong ceramic article having a complex, but easily formed shape.

EXAMPLE 2

The procedures of Example 1 are repeated with the difference that the block polymer elastomer used is a commercially available triblock (ABA) polymer having a polybutadiene center block and polystyrene end blocks. This polymer contains about 28% by weight polystyrene (i.e. Kraton 1102) and has a lower viscosity than the one previously exemplified and identified as having 33.3 weight % polystyrene. Kraton is a tradename of Shell Oil Company. Kraton 1102 has an intrinsic viscosity of 0.84 dl/g (30° C. in toluene). The lower viscosity allows compositions to be processed more easily, i.e. at 125° C. on the 2 roll mill. Injection molding required a barrel temperature of 120° C. This results in a strong ceramic article having a complex shape.

EXAMPLE 3

The procedures of Example 2 are repeated with the difference that 4.0 grams of submicron particle size graphite, obtained from Columbian Carbon, are added to the elastomer along with the microcrystalline cellulose and paraffin wax.

This results in a strong, dense ceramic article in a complex shape which has undergone less shrinkage and because of the higher volume fraction of carbon contains more silicon carbide and less silicon upon subsequent conversion.

EXAMPLE 4

The procedures of Example 2 are repeated with the difference that 5.0 grams of a commercially available paraffinic petroleum oil is substituted for 5.0 grams of paraffin wax. The oil, Flexon 845, a Trademark of Exxon Company, U.S.A., has the following properties: specific gravity (60/60° F.) of 0.8649-0.8811; color (ASTM) of 1-4; viscosity (210° F.) of 43.4-51.5 S.U.S.; aniline point of 219°-240° F. and silica gel aromatics of 14.9-16.1 weight %.

This results in a strong ceramic article having a complex shape.

EXAMPLE 5

The procedures of Example 2 are repeated with the exceptions that 13.0 grams pre-carbonized cellulose, 3.0 grams graphite and 5.0 grams wax are added to 5.0 grams Kraton 1102. Pre-carbonized cellulose is produced by heating the cellulose previously described in Example 1 to 1100° C. under nitrogen at a heating rate of 19° C. per hour. Injection molding is carried out with the mold held at 60° C. then cooled to room temperature before removing the part. No supporting sand is required when heating the part to 1100° C. under nitrogen.

This results in a strong ceramic article formed in a complex shape with negligible shrinkage occurring between molding and production of the final article.

EXAMPLE 6

The procedures of Example 5 are repeated except that 15.5 grams precarbonized cellulose, 3.0 grams graphite and 6.2 grams of paraffin wax are added to 5.0 grams Kraton 1102.

The results in a strong ceramic article formed in a complex shape with negligible shrinkage occurring between molding and production of the final article. Because of the higher volume fraction of carbon, the article contains more silicon carbide and less silicon upon subsequent conversion.

EXAMPLE 7

The procedures of Example 5 are repeated with the differences that 4 grams petroleum pitch having a softening point of 176° C. are first mixed with 10 grams Kraton 1102 on a two roll mill at 150° C. The pitch is supplied by Allied Chemical Company. After mixing, 11.1 grams paraffin wax having a melting point of about 130° C., 16 grams precarbonized cellulose and 14 grams graphite are added and mixed for 4 hours at 150° C. and a mold temperature of 60° C.

This results in a strong ceramic article formed in a complex shape with negligible shrinkage occurring during molding and production of the final article, with the additional advantage that the strength of the carbonaceous body formed by heating is improved.

EXAMPLE 8

The procedure of Example 5 are repeated with the differences that 4.0 grams polystyrene, a commercial product of Dow Chemical Company designated Styron B, are first mixed with 8.0 grams Kraton 1102 on a two roll mill at 140° C. The roll temperature is then reduced to 120° C. and, 19.2 grams precarbonized cellulose, and 12 grams paraffin wax are mixed in over three hours.

This results in a strong ceramic article formed in a complex shape with negligible shrinkage occurring during molding and production of the final article, with the additional advantage that the strength of the carbonaceous body formed by heating is improved. The processability of the composition is improved.

EXAMPLE 9

The procedures of Example 6 are repeated with the differences that 2.5 grams polystyrene, a commercial product of Dow Chemical Company designated Styron B, are first mixed with 5 grams Kraton 1102 on the roll mill at 140° C. The mill temperature is then reduced to 125° C. and 2.5 grams paraffin wax, 7.5 grams graphite and 7.5 grams precarbonized cellulose are mixed in.

This results in a strong ceramic article formed in a complex shape with negligible shrinkage occurring during molding and production of the final article, with the additional advantage that the strength of the carbonaceous body formed by heating is improved. The rate of penetration of the carbonaceous body by silicon is enhanced.

EXAMPLE 10

The procedures of Example 2 are followed with the exceptions that 12 grams Kraton 1102 is first banded on the mill, then the temperature is reduced to 115° C. and 8.0 grams paraffin wax and 26.5 grams graphite are mixed in.

The reaction between the carbonaceous body derived from this composition and silicon is more rapid than the other compositions described.

This results in a strong ceramic article formed in a complex shape with negligible shrinkage occurring between molding and production of the final article. Less residual carbon remains than is obtained from carbonized cellulose.

EXAMPLE 11

The procedures of Example 10 are followed with the exception that 6 grams submicron β-SiC obtained from PPG are mixed into 10.0 grams Kraton 1102 along with 24.0 grams graphite and 10.0 paraffin wax. The reaction between silicon and the carbonaceous body derived from this composition proceeds at a slower rate than in Example 10.

This results in a strong ceramic article formed in a complex shape with negligible shrinkage occurring between molding and production of the final article, low residual carbon and more easily controllable reaction rate.

EXAMPLE 12

The procedures of the previous examples are repeated except that carbon fibers are used as the principal carbon source in place of cellulose. Carbon fibers of 10 $\mu$m diameter are first chopped in a Waring blendor in the presence of water. (These fibers are a commercial product of Union Carbide designated VMD Thornel grade mat fiber.) The fibers are reduced to a typical length of several hundred $\mu$m by this procedure. After drying, 13.3 grams carbon fibers and 5.0 grams paraffin wax are mixed into 5.0 grams Kraton 1102.

This results in a strong ceramic article formed in a complex shape with negligible shrinkage occurring between molding and production of the final article. The carbonized body exhibits higher strength.

EXAMPLE 13

The procedures of Examples 1 through 12 are repeated with the difference that a block polymer elastomer prepared by a different synthetic route and possessing altered molecular structure is employed. A block polymer elastomer, hereinafter called "the elastomer", is prepared by an anionic initiated polymerization using the basic high vacuum apparatus and general procedures for anionic polymerization described in reaction 2 (Experimental Techniques) of the aforecited article "Procedures for Homogeneous Anionic Polymerization", by L. J. Fetters. In addition, all attachments of the vessels to the vacuum line are accomplished through a grease trap as shown in the aforecited article "The Association of Polystyryllithium, Polyisoprenyllithium, and Polybutadienyllithium in Hydrocarbon Solvents" by M. Morton et al.

The reactor is first flamed while under vacuum. The reactor is cooled, sealed off from the vacuum line, and then rinsed with a solution of ethyllithium in n-hexane to react with any residual materials that could terminate the growing polymer chains. The monomers and solvents to be used in preparing the elastomer are purified according to the article by L. J. Fetters last mentioned above.

The reactor is reattached to the vacuum line. A solution containing 0.036 grams of ethyllithium in 3 ml. benzene is added to the reactor. To the reactor is charged 370 ml. of Benzene. Styrene monomer in the amount of 20 grams is distilled into the reactor through a breakseal onto the top of the benzene. The contents are cooled to dry-ice/alcohol temperatures e.g., $-65°$ C. to $-78°$ C. The reactor is sealed off from the vacuum line and the contents allowed to warm-up from a dry-/ice alcohol temperature. As soon as the contents have thawed 0.65 grams of anisole in 4 ml. of benzene is added and shaken with the benzene and styrene in the reactor. The polymerization of the styrene is allowed to proceed for 4 hours at 30° C. The reactor is then reattached to the vacuum line and 30 grams of butadiene is distilled in. After the contents have been cooled with liquid nitrogen, the reactor is sealed off from the vacuum line. The mixture is allowed to thaw and after stirring the polymerization of butadiene is allowed to proceed at 30° C. for 16 hours. Next, 0.164 grams of trichloromethylsilane in 3 ml. of benzene is added from an ampule by breaking the breakseal. The mixture is stirred and then allowed to react for 4 hours at 30° C. The elastomer in the reactor is then coagulated by slowly pouring the benzene solution into methanol containing a small amount of phenylbetanaphthylamine to stabilize the elastomer. The elastomer is dried and is then ready for use as the principal binder resin as in Example 1.

EXAMPLE 14

The procedures of Examples 1 through 13 are repeated with the single difference that the block polymer elastomer used is a commercially available block polymer containing polystyrene and polybutadiene. This block polymer contains 40 weight percent polystyrene, i.e., Solprene 414-C. Solprene is a trademark of Phillips Petroleum Company. This block polymer has specific gravity of about 0.93, melt flow 72 (grams/10 min. at 190° C. with 21.6 kg.), and apparent viscosity 46,000 poise at 10 sec$^{-1}$ at room temperature.

This results in a strong ceramic article having a complex shape.

EXAMPLE 15

The procedures of Examples 1 through 14 are repeated with the single difference that the components are first stirred together and then mixed in a Banbury mixer which is preheated to 175° C. for 8 minutes. The resulting mixture is then banded on a two roll mill which has been preheated to 150° C. After two to five minutes of mill mixing, the composition is sheeted and allowed to cool.

This results in a strong ceramic article having a complex shape.

EXAMPLE 16

The procedures of Examples 1 through 15 are repeated with the difference that ribbed sheets of the mixtures are prepared by compression molding. A mixed composition is banded on a 150° C. mill and the nip width is decreased so that a sheet 0.030 inch thick is obtained. A preform 3½ inch square is cut from the 0.030 inch thick sheet, the same providing an excess of material for the ribbed mold being used. A press with a 3⅝ inch diameter ram and the bottom half of the mold are preheated to 125° C. The preform is then placed on the preheated bottom half of the mold for 15 seconds. The unheated top half of the mold is then placed upon the preform and the bottom half. Both halves of the mold are coated with polytetrafluoroethylene. The press is closed and a pressure of 2,000 psig is applied. This pressure is maintained for 15 seconds. The pressure is then released and the ribbed sheet removed from the mold.

This results in a strong ceramic ribbed sheet.

EXAMPLE 17

The procedures of Examples 1 through 15 are repeated with the difference that a flat sheet is prepared by use of a screw type extruder having a 2 inch bore. The mixture is pelletized and the pellets are fed into the hopper of the extruder. It is then conveyed through the extruder and passed through a thin slit die (0.020 inch thick, 4 inches wide). The temperature settings of the extruder are: feed section 105° C., transition section 160° C., and die section 170° C. The sheet is then cooled to room temperature. The cooled sheet is flexible and suitable for subsequent handling such as slitting, rewinding and embossing and after subsequent treatment, yields a strong ceramic article.

What is claimed is:

1. A method for making a porous carbon body, which comprises:
   (A) providing an intimate admixture comprising:
      (1) a block polymer component corresponding to the formula $$AB\,(AB)_\eta{-}A, \text{ or} \qquad (a)$$

$$X{-}(B{-}(AB)_\eta{-}A)_{\eta'}, \qquad (b)$$

both 1(a) and 1(b) $\qquad (c)$ in which $\eta$ is zero or a positive integer, $\eta'$ is a positive integer greater than 2, A is a linear or branched polymer that is glassy or crystalline at 20°–25° C. and has its softening point in a range between about 80°–250° C. and B is a polymer of different chemical composition from A that behaves as an elastomer at a temperature between 15° C. below the softening point of A and 120° C., and X is a multifunctional linking group, A or B;
      (2) a plasticizer for (A) which is selected from the group consisting of
         (a) an oil at least 75 percent by weight of which boils in the range of about 550° F. to about 1038° F. has a viscosity at 210° F. in the range of about 30 to about 220 Saybolt Universal Seconds and aniline point in the range of about 170° F. to about 255° F.,
         (b) a wax melting at a temperature of about 130° F. to about 170° F. at least 75 percent by weight of which boils at temperatures in the range of about 600° F. to about 900° F., and
         (c) both 2(a) and 2(b);
      (3) one or more carbonaceous or carbon yielding materials in particulate form;
   (B) forming with heat and pressure the intimate admixture into a molded body;
   (C) exposing to gradually elevating temperature the molded body in a non-oxidizing atmosphere that expels a portion of the block polymer and carbonizes the residue to provide a porous carbon body.

2. A method in accordance with claim 1, wherein the block polymer component comprises:

$$AB\,(AB)_\eta{-}A \qquad (a)$$

and "B" of this block polymer (a) behaves as an elastomer between about 5° C. below the softening point of "A" of said block polymer and about 90° C. above the softening point of "A" of this block polymer.

3. A method in accordance with claim 1, wherein the block polymer component comprises additionally:

$$X{-}(B{-}(AB)_\eta{-}A)_{\eta'}. \qquad (b)$$

4. A method in accordance with claim 1 or 2 or 3 wherein the particulate comprises elemental carbon and the plasticizer comprises paraffin wax.

5. A method in accordance with claims 1 or 2 or 3 wherein the particulate solid comprises a cellulose and the plasticizer comprises paraffin wax.

* * * * *

UNITED STATES PATENT AND TRADEMARK OFFICE
CERTIFICATE OF CORRECTION

PATENT NO. : 4,196,182
DATED : April 1, 1980
INVENTOR(S) : Pierre A. Willermet et al.

It is certified that error appears in the above—identified patent and that said Letters Patent is hereby corrected as shown below:

Column 15, line 14, cancel "or".

Column 15, line 16, after "$X-(B-(AB)_n-A)_{n'}$," add -- or --.

Column 16, line 24, cancel "1" and insert -- 2 --.

Signed and Sealed this

Eleventh Day of May 1982

[SEAL]

Attest:

GERALD J. MOSSINGHOFF

*Attesting Officer*     *Commissioner of Patents and Trademarks*